US008437900B2

United States Patent
Nishijima et al.

(10) Patent No.: US 8,437,900 B2
(45) Date of Patent: May 7, 2013

(54) CONTROL DEVICE FOR GUIDED TRAVEL OF UNMANNED VEHICLE

(75) Inventors: Akiharu Nishijima, Kanagawa (JP); Masaki Mori, Kanagawa (JP)

(73) Assignee: Komatsu Ltd., Tokyo (JP)

( * ) Notice: Subject to any disclaimer, the term of this patent is extended or adjusted under 35 U.S.C. 154(b) by 939 days.

(21) Appl. No.: 12/011,805

(22) Filed: Jan. 29, 2008

(65) Prior Publication Data

US 2010/0292883 A1  Nov. 18, 2010

(30) Foreign Application Priority Data

Jan. 30, 2007  (JP) .................. 2007-019413

(51) Int. Cl.
*G01C 22/00* (2006.01)
*G05D 1/00* (2006.01)

(52) U.S. Cl.
USPC ............................................ 701/23; 701/25

(58) Field of Classification Search ............... 701/23–26
See application file for complete search history.

(56) References Cited

U.S. PATENT DOCUMENTS

| | | | | |
|---|---|---|---|---|
| 2001/0021888 A1* | 9/2001 | Burns et al. | ..................... | 701/23 |
| 2002/0099481 A1* | 7/2002 | Mori | ............................. | 701/23 |
| 2008/0059015 A1* | 3/2008 | Whittaker et al. | ............. | 701/23 |

FOREIGN PATENT DOCUMENTS

| | | |
|---|---|---|
| JP | 11-304904 | 5/1999 |
| JP | 2000-029521 | 1/2000 |
| JP | 2000-284830 | 10/2000 |

OTHER PUBLICATIONS

Japanese Patent Office Action for related application No. 2008-018738 dated Feb. 21, 2012.

* cited by examiner

*Primary Examiner* — Thomas Tarcza
*Assistant Examiner* — Imran Mustafa
(74) *Attorney, Agent, or Firm* — Husch Blackwell LLP (57) ABSTRACT

A control device for guided travel of an unmanned vehicle, in which the unmanned vehicle is guided to travel by receiving a signal sent from a GPS satellite by the unmanned vehicle, measuring its own vehicle position based on the signal, and controlling such that a positional shift between the vehicle position and a target point that is a passing point sequentially set on a target traveling course falls into an allowable range for controlling error, wherein a guidable range is set in advance such that a position measurement error is added to the allowable range for controlling error; the position measurement error is obtained based on position measurement accuracy information from the signal; the allowable range for controlling error is changed according to the obtained position measurement error; and control is performed such that the positional shift falls into the changed allowable range for controlling error.

8 Claims, 8 Drawing Sheets

PRIOR ART

CONTROL DEVICE FOR GUIDED TRAVEL OF UNMANNED VEHICLE

This application claims priority of Japanese Patent Application No. 2007-019413 filed on Jan. 30, 2007.

BACKGROUND OF THE INVENTION

1. Field of the Invention

The present invention relates to a control device for guided travel of an unmanned vehicle, more specifically to a control device for guided travel of unmanned vehicle, in which the unmanned vehicle is guided to travel based on a signal sent from a GPS satellite.

2. Disclosure of the Related Art

In large-scale working sites, such as quarries to crush stone and mines, an unmanned dump truck traveling system is employed. In this system, unmanned dump trucks, namely, unmanned vehicles are guided to travel along a target travel course, and carry earth and sand.

In the working sites, it is significantly important for safety reasons to make the unmanned vehicle, which automatically runs, travel without interfering with other vehicles or obstacles.

When the unmanned vehicle is guided to travel, errors occur due to various factors. Thus, in addition to the target travel course, a guidable range is set as an area for safely guiding the vehicle to travel.

Figure 1:
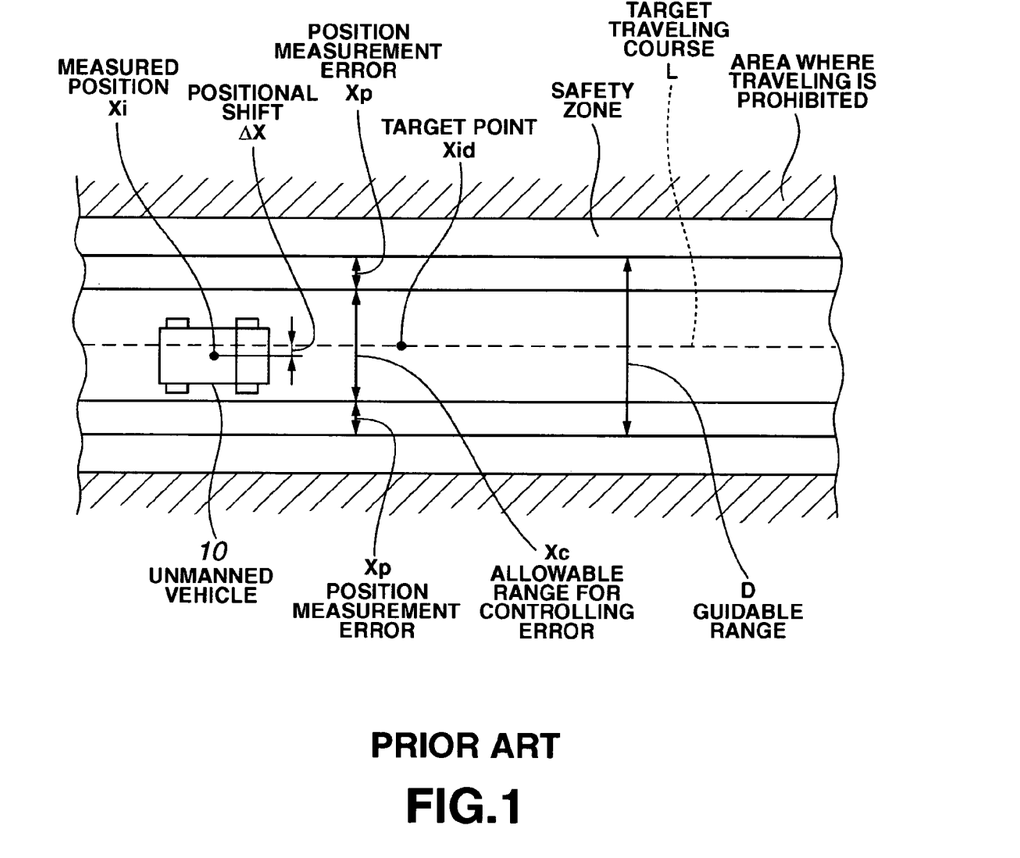
FIG. 1 is a diagram of a related art, showing a top view where an unmanned vehicle is guided to travel.

FIG. 1 is a diagram of a related art, showing a top view where an unmanned vehicle 10 is guided to travel.

The unmanned vehicle 10 measures a position Xi of the unmanned vehicle 10 itself, and controls such that a positional shift $\Delta X$ between a measured vehicle position Xi and each target point Xid, which is one of passing points sequentially set on a target travel course L, falls into an allowable range for controlling error Xc. Then, the guided travel is performed.

The vehicle position Xi of the unmanned vehicle 10 is measured with a GPS position measurement device provided to the unmanned vehicle 10. Specifically, the unmanned vehicle 10 receives a signal sent from a GPS satellite, and measures the position Xi of the vehicle 10 itself based on the received signal.

The accuracy of the positional measurement with the GPS position measurement device depends on arrangement or position of the GPS satellite or other factors, and varies dynamically. The positional information obtained from the signal sent from the GPS satellite includes position measurement accuracy information. The accuracy of the positional measurement with the GPS position measurement device can be known based on the position measurement accuracy information.

Japanese Patent Application Laid-open No. 2000-284830 discloses an invention in which, in addition to the GPS position measurement device, an unmanned vehicle is provided with a position measurement device using a dead reckoning, and the positional measurement is switched to the positional measurement with the dead reckoning at the time when the accuracy of the positional measurement with the GPS position measurement device becomes deteriorated.

Here, total guidance error X of the unmanned vehicle 10 is defined by the following expression.

$$X \text{ (guidance error)} = 2Xp \text{ (position measurement error)} + \Delta X \text{ (positional shift)} \quad (1),$$

where the position measurement error 2Xp is a total value combining each of the right error Xp and the left error Xp set around the target travel course L.

On the other hand, a guidable range D in which the allowable range for control accuracy Xc is added to the position measurement error 2Xp is defined by the following expression.

$$D \text{ (guidable range)} = 2Xp \text{ (position measurement error)} + Xc \text{ (allowable range for controlling error)} \quad (2)$$

An area outside the guidable range is a safety zone, a zone for other vehicles, obstacles or an area where traveling is prohibited such as road shoulders.

For this reason, a condition for safely guiding the unmanned vehicle 10 to travel is:

$$D \text{ (guidable range)} > X \text{ (guidance error)} \quad (3).$$

On the other hand, if the guidance error X exceeds the guidable range D, in other words, if the positional shift $\Delta X$ exceeds the allowable range for controlling error Xc, the unmanned vehicle 10 is controlled to reduce the speed or be stopped for safety reasons because there is a possibility that the unmanned vehicle 10 goes into the safety zone, or goes beyond the safety zone and enters into the area where traveling is prohibited.

Conventionally, a size of the position measurement error 2Xp is equally set.

Here, a size of the guidable range D depends on topographical features of the working site. In a place where a margin for the traveling course of the unmanned vehicle 10 is tight, the guidable range D becomes narrow, and the allowable range for control accuracy Xc becomes narrow correspondingly (see the expression (2) above). Therefore, in a place where the width of the traveling course is tight, the positional shift $\Delta X$ of the unmanned vehicle 10 is likely to go beyond the allowable range of control accuracy Xc, which causes frequent speed reductions or stops of the unmanned vehicle 10, and a decrease in the productivity.

Additionally, in the conventional technique, the unmanned vehicle is equally stopped when information (status information or error information) on the accuracy of the positional measurement included in the positional measurement accuracy information sent from the GPS satellite indicates that "accuracy of the positional measurement is poor." Therefore, the productivity becomes decreased in a situation where the accuracy of the positional measurement is poor.

SUMMARY OF THE INVENTION

The present invention has been made in view of the circumstances above, and has an object to increase the productivity by lowering the frequency at which the speed of the unmanned vehicle 10 is reduced and the unmanned vehicle 10 is stopped even in a place a margin for the traveling course of the unmanned vehicle 10 is tight, and avoiding the unmanned vehicle 10 from stopping even when the positional measurement accuracy information sent from the GPS satellite contains information that "accuracy of the positional measurement is poor."

A first aspect of the present invention provides a control device for guided travel of an unmanned vehicle, in which the unmanned vehicle is guided to travel by receiving, by the unmanned vehicle, a signal sent from a GPS satellite, measuring its own vehicle position based on the received signal, and controlling such that a positional shift ($\Delta X$) between the measured vehicle position and a target point that is a passing point sequentially set on a target traveling course falls into an allowable range for controlling error, wherein a guidable range is set in advance such that a position measurement error (2Xp) is added to the allowable range for controlling error; the position measurement error (2Xp) is obtained based on position measurement accuracy information acquired from the signal sent from the GPS satellite; the allowable range for controlling error is changed according to the obtained position measurement error (2Xp); and control is performed such that the positional shift (ΔX) between the measured vehicle position and the target point that is a passing point sequentially set on the target traveling course falls into the changed allowable range for controlling error.

A second aspect of the present invention provides a control device for guided travel of an unmanned vehicle, in which the unmanned vehicle is guided to travel by receiving, by the unmanned vehicle, a signal sent from a GPS satellite, measuring its own vehicle position based on the received signal, and controlling such that a positional shift (ΔX) between the measured vehicle position and a target point that is a passing point sequentially set on a target traveling course falls into an allowable range for controlling error, wherein the allowable range for controlling error is set in advance such that a position measurement error (2Xp) is subtracted from a guidable range; the position measurement error (2Xp) is obtained based on position measurement accuracy information acquired from the signal sent from the GPS satellite; the guidable range is changed according to the obtained position measurement error (2Xp); control is performed such that the positional shift (ΔX) between the measured vehicle position and the target point that is a passing point sequentially set on the target traveling course falls into the allowable range for controlling error.

A third aspect of the present invention provides the control device for guided travel of the unmanned vehicle according to the first or second aspect of the present invention, wherein the position measurement accuracy information acquired from the signal sent from the GPS satellite is status information indicating a status of positional measurement with a GPS, and the position measurement error (2Xp) is changed according to the status information.

A fourth aspect of the present invention provides the control device for guided travel of the unmanned vehicle according to the first or second aspect of the present invention, wherein the position measurement accuracy information acquired from the signal sent from the GPS satellite is error information indicating an error of positional measurement with a GPS, and the position measurement error (2Xp) is changed according to the error information.

Figure 4:
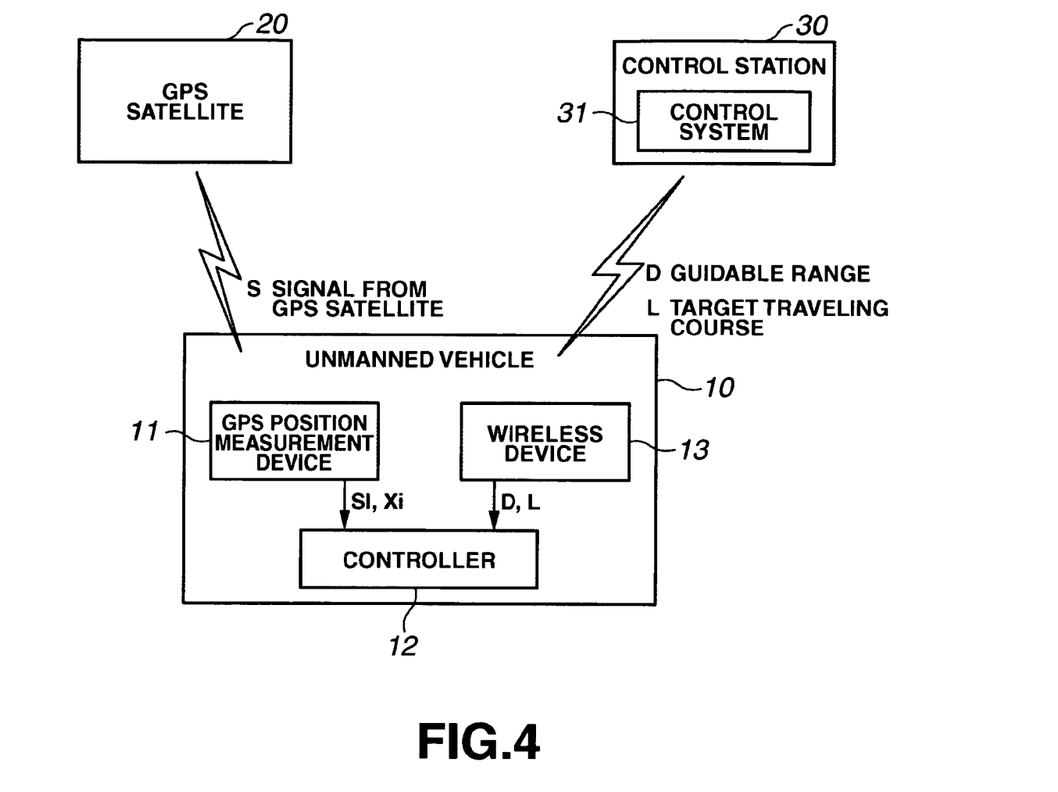
FIG. 4 is a diagram of a configuration of the first example, showing a configuration diagram explaining a flow of data between the unmanned vehicle, a GPS satellite and a control station.
Figure 5:
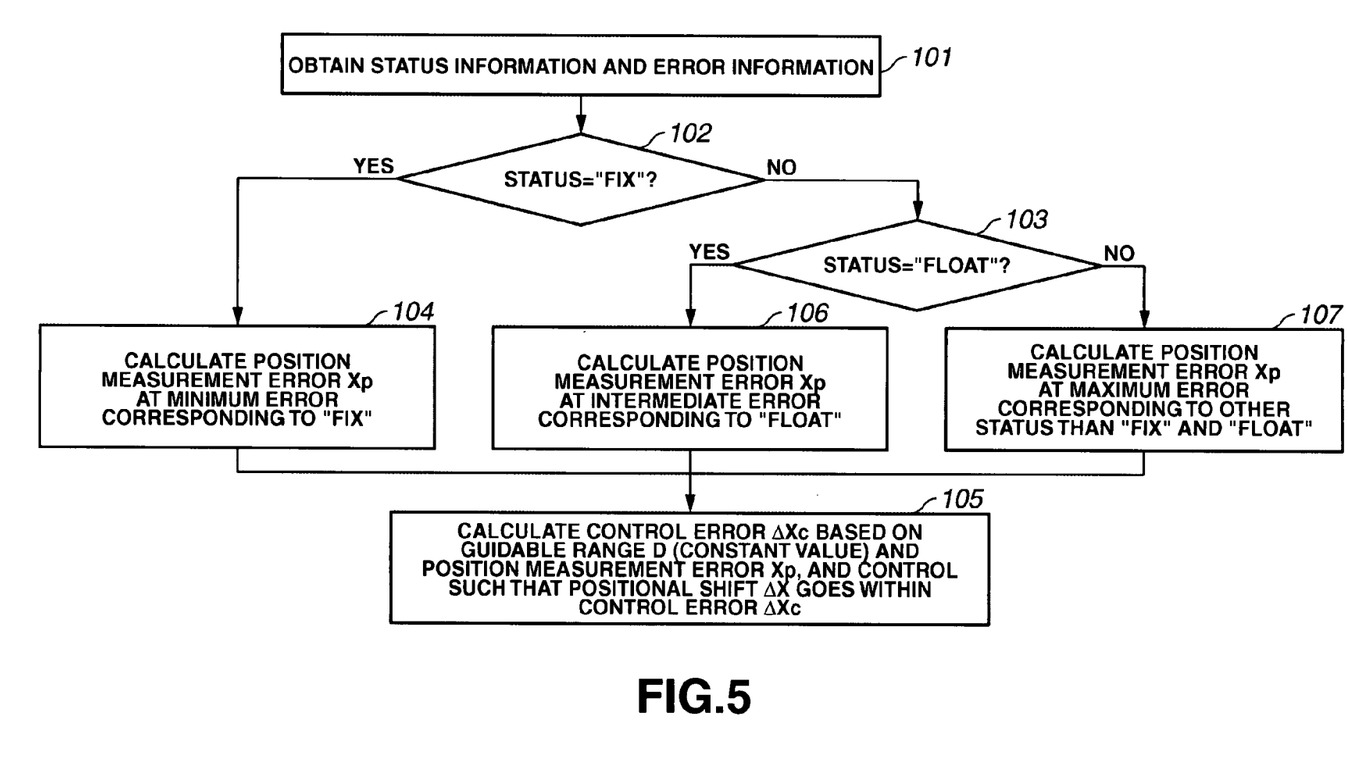
FIG. 5 is a flow chart showing a process procedure of the first example, explaining a process implemented by a controller in the unmanned vehicle.
Figure 6:
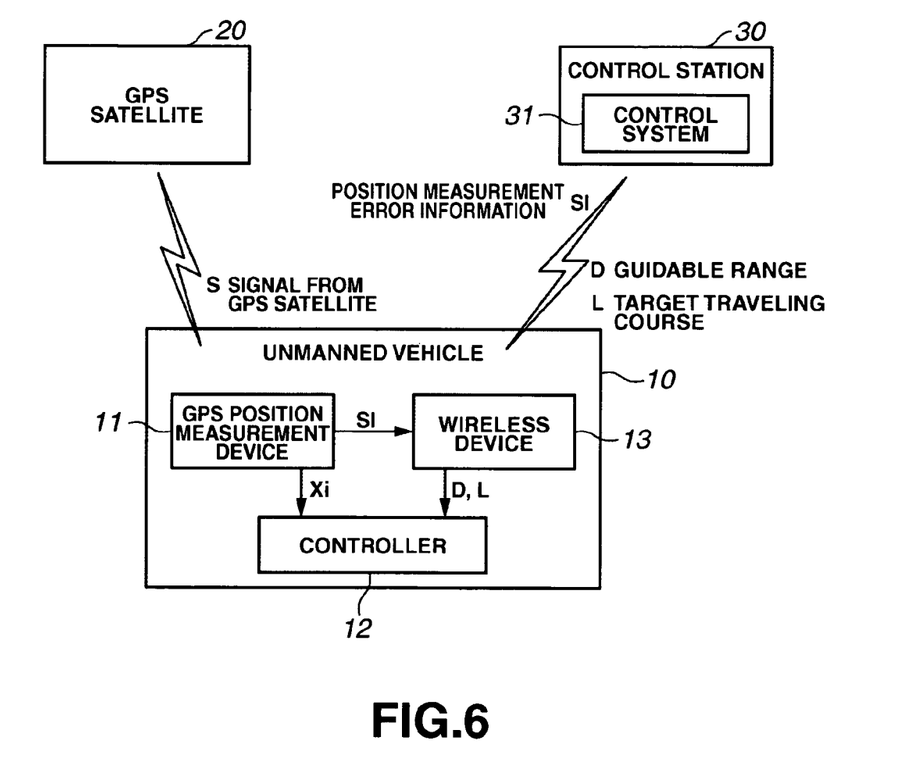
FIG. 6 is a diagram of a configuration of the second example, showing a configuration diagram explaining a flow of data between the unmanned vehicle, the GPS satellite and the control station.

The present invention has been made on the assumption of, as shown in FIGS. 4 to 6, a control device for guided travel of an unmanned vehicle in which the unmanned vehicle 10 is guided to travel by receiving, by the unmanned vehicle 10, a signal S sent from a GPS satellite 20, measuring a position Xi of the unmanned vehicle 10 itself based on the received signal S, and controlling such that a positional shift between the measured vehicle position Xi and a target point Xid, which is a passing point sequentially set on a target traveling course L, falls into an allowable range for controlling error Xc.

Figure 2A:
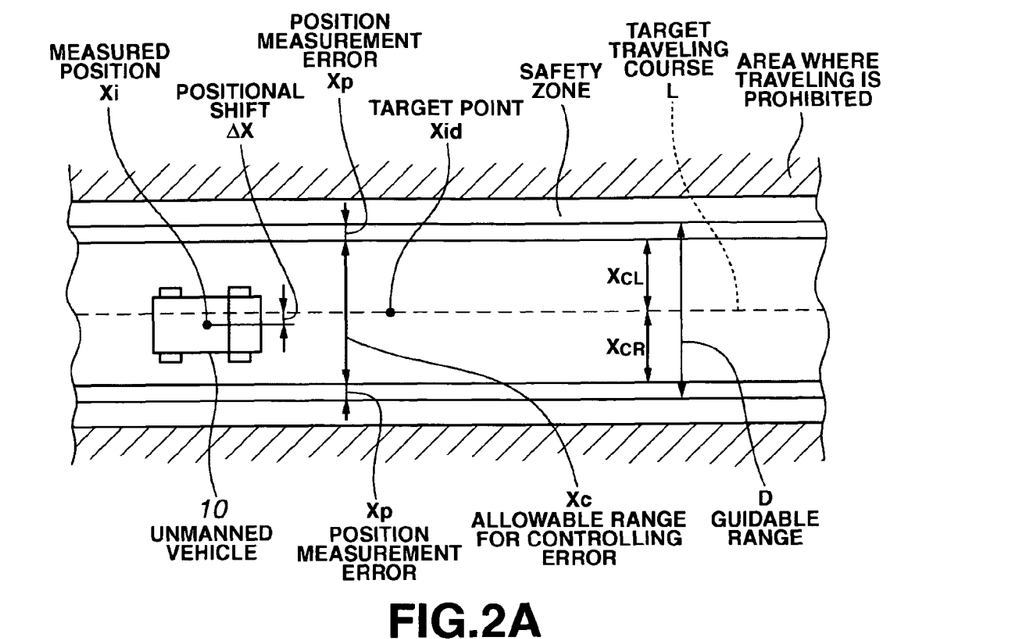
FIGS. 2A and 2B are diagrams of the first example, showing a top view where the unmanned vehicle is guided to travel.
Figure 2B:
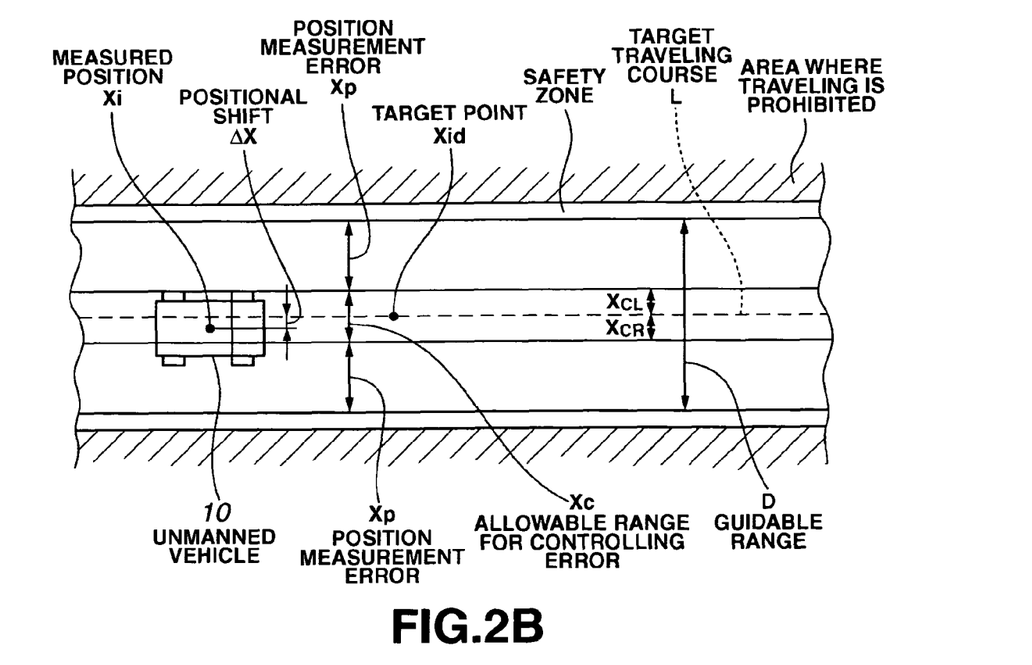

In the first aspect of the present invention, as shown in FIGS. 2A and 2B, a size of a guidable range D is set in advance such that a position measurement error 2Xp is added to the allowable range for controlling error Xc (D (guidable range)=2Xp (position measurement error)+Xc (allowable range for controlling error)=constant).

Then, the position measurement error 2Xp is obtained based on positional measurement accuracy information S1 acquired from the signal S sent from the GPS satellite 20. Additionally, the size of the allowable range for controlling error is changed in accordance with the obtained position measurement error 2Xp (Xc (allowable range for controlling error)=D (guidable range; constant)−2Xp (position measurement error)). Furthermore, control is performed such that the positional shift ΔX between the measured vehicle position Xi and the target point Xid, which is a passing point sequentially set on the target traveling course L, falls into the changed allowable range for controlling error Xc.

From the relational expression of

Xc (allowable range for controlling error)=D (guidable range; constant)−2XP (position measurement error), even in a place where a margin for the guidable range D is tight due to limitation from the topographical features of the working site, as shown in FIG. 2A, if a situation of the accuracy of the positional measurement with the GPS is good, the position measurement error 2Xp becomes small, and the allowable range for controlling error Xc can be enlarged correspondingly. Thus, the positional shift ΔX is less prone to go beyond the allowable range for controlling error, resulting in lowering the frequency at which the speed of the unmanned vehicle 10 is reduced and the unmanned vehicle 10 is stopped. Accordingly, the productivity can be increased.

Additionally, unlike the conventional technique, as shown in FIG. 2B, there is no need to stop each of the unmanned vehicles 10 even if information (status information or error information) on the accuracy of the positional measurement included in the positional measurement accuracy information S1 sent from GPS satellites 20 indicates that "accuracy of the positional measurement is poor." In a situation where the accuracy of the positional measurement with the GPS is poor, the position measurement error 2Xp becomes large, and the allowable range for controlling error Xc becomes small correspondingly. Although this causes the positional shift ΔX of the unmanned vehicle 10 to be likely to go beyond the allowable range Xc for controlling error Xc, the unmanned vehicle 10 can be traveled without stopping. Accordingly, the productivity is increased.

Figure 3A:
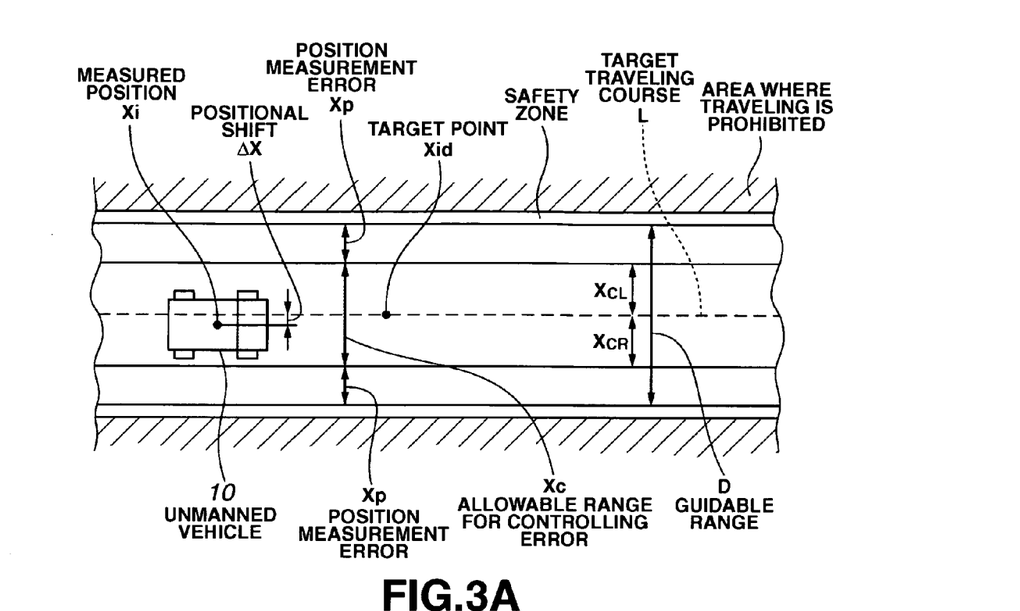
FIGS. 3A and 3B are diagrams of the second example, showing a top view where the unmanned vehicle is guided to travel.
Figure 3B:
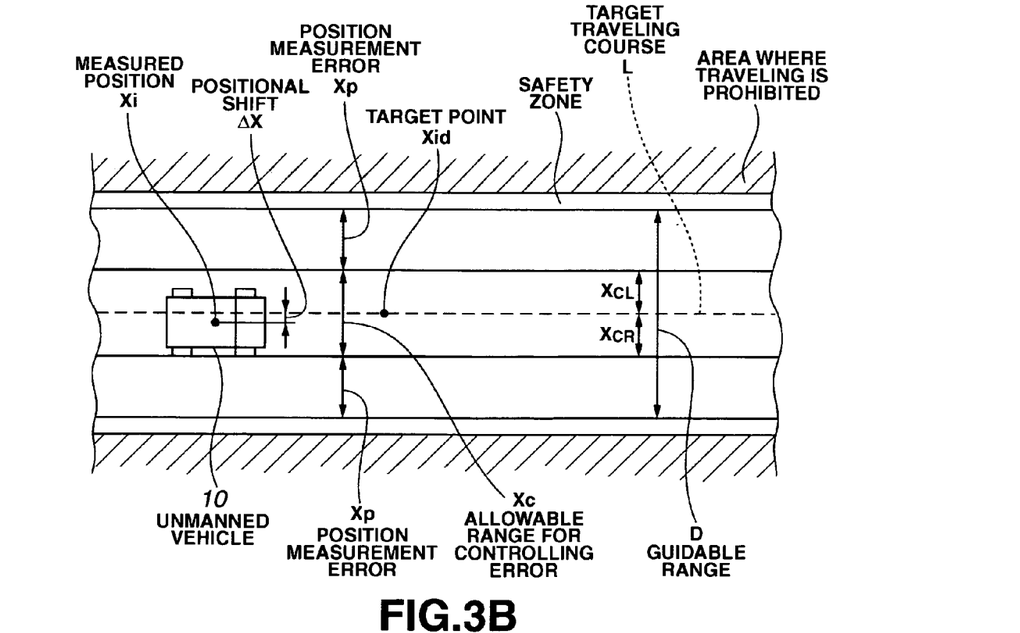

In the second aspect of the present invention, as shown in FIGS. 3A and 3B, the size of the allowable range for controlling error Xc is set in advance such that the position measurement error 2Xp is subtracted from the guidable range D (Xc (allowable range for controlling error)=D (guidable range)−2Xp (position measurement error)=constant).

Then, the position measurement error 2Xp is obtained based on positional measurement accuracy information S1 acquired from the signal S sent from the GPS satellite 20. Additionally, the size of the allowable range of controlling error is changed in accordance with the obtained position measurement error 2Xp (D (guidable range)=2Xp (position measurement error)+Xc (allowable range for controlling error; constant)). Furthermore, control is performed such that the positional shift ΔX between the measured vehicle position Xi and the target point Xid, which is a passing point sequentially set on the target traveling course L, falls into the allowable range for controlling error Xc.

When there is a sufficient margin for the traveling course of the unmanned vehicle 10, the allowable range for controlling error may be increased.

From the relationship expression of

Xc (allowable range for controlling error; constant)=D (guidable range)−2Xp (position measurement error), as shown in FIG. 3A, in a situation where the accuracy of the positional measurement with the GPS is good, the position measurement error 2Xp becomes small, and the guidable range D becomes small correspondingly. Since the allowable range for controlling error Xc is originally set to a large size, the positional shift ΔX of the unmanned vehicle 10 is less likely to go beyond the allowable range for controlling error Xc, resulting in lowering the frequency at which the speed of the unmanned vehicle 10 is reduced and the unmanned vehicle is stopped. Accordingly, the productivity is increased.

Additionally, unlike the conventional technique, as shown in FIG. 3B, there is no need to stop each of the unmanned vehicles 10 even if information (status information or error information) on the accuracy of the positional measurement included in the positional measurement accuracy information S1 sent from GPS satellites 20 indicates that "accuracy of the positional measurement is poor." In a situation where the accuracy of the positional measurement with the GPS is poor, the guidable range D is set to a large size in accordance with the large position measurement error 2Xp, and control for guided travel of the unmanned vehicle 10 is performed as normal, whereby the unmanned vehicle 10 can be traveled without stopping. Accordingly, the productivity is increased. Since there is the sufficient margin for the traveling course of the unmanned vehicle 10, even if the position measurement error 2Xp becomes large, the guidable range D can be changed to a large size. Thus, even in a situation where the accuracy of the positional measurement is poor, the guided travel of the unmanned vehicle 10 can be performed with the large allowable range for controlling error Xc, as in a situation where the accuracy of the positional measurement is good. Since the allowable range for controlling error Xc is set to the large size, the positional shift ΔX of the unmanned vehicle 10 is less likely to go beyond the allowable range for controlling error Xc, resulting in lowering the frequency at which the speed of the unmanned vehicle 10 is reduced and the unmanned vehicle 10 is stopped. Accordingly, the productivity is increased.

The positional measurement accuracy information S1 acquired from the signal S sent from the GPS satellite 20 is status information indicating a status of the positional measurement with the GPS. The position measurement error 2Xp is changed in accordance with the status information (third aspect of the present invention).

Additionally, the positional measurement accuracy information S1 acquired from the signal S sent from the GPS satellite 20 is error information indicating an error of the positional measurement with the GPS. The position measurement error 2Xp is changed in accordance with the error information.

DETAILED DESCRIPTION OF THE INVENTION

Hereinbelow, exemplary embodiments of a control device for guided travel of an unmanned vehicle according to the present invention will be described with reference to drawings. It should be noted that a dump truck is assumed as the unmanned vehicle in the exemplary embodiments.

FIRST EXAMPLE

In the first example, it is assumed that the unmanned vehicle 10 travels in a place where there is an insufficient margin for a width of a guidable range D due to limitation from the topographical features of the working site. Needless to say, it may be possible to apply the first example to a case where the unmanned vehicle 10 travels in a place where there is a sufficient margin for the width of the guidable range D.

FIG. 4 is a configuration diagram explaining a flow of data between the unmanned vehicle 10, a GPS satellite 20 and a control station 30.

As shown in FIG. 4, the unmanned vehicle 10 comprises a GPS (Global Positioning System) position measurement device 11, a controller 12, and a wireless device 13. Additionally, in a given location in the working site, the control station 30 for controlling the unmanned vehicle 10 is provided. It should be noted that the differential GPS is assumed in the first example. It should be noted that a figure of a GPS base station that receives a signal sent from the GPS satellite 20, generates a position error correction signal and sends the generated signal to the unmanned vehicle 10 is omitted.

The GPS position measurement device 11 is a device that receives a signal S sent from the GPS satellite 20, measures a current position Xi of the unmanned vehicle 10, extracts from the signal S a position measurement accuracy information S1 necessary for guided travel control of the unmanned vehicle 10, and sends the position measurement accuracy information 51 and the measured position Xi to the controller 12. The wireless device 13 is a device for receiving data on a target traveling course L and data on a guidable range D, which will be described later, both of the data being sent from the control station 30 through wireless transmission. The controller 12 is a device that obtains via the wireless device 13 the data on the target travel course L and the data on the guidable range D, which will be described later, sent from the control station 30 through wireless transmission; receives data on the measured position Xi and data on the position measurement accuracy information S1 sent from the GPS position measurement device 11; and controls traveling and steering such that the unmanned vehicle 10 is guided to travel along the target traveling course L based on those data.

The control station 30 is provided with a control system 31. The control system 31 is a device for sending the data on the target traveling course L and the data on the guidable range D to the wireless vehicle 10 through wireless communication. In the first example, the guidable range D is preset for each point on the target traveling course L to a constant value based on the topographical feature of the working site.

As shown in FIGS. 2A and 2B, the traveling and steering of the unmanned vehicle 10 is controlled such that the positional shift ΔX between the measured vehicle position Xi and the target point Xid, which is a passing point sequentially set on the target traveling course L, falls into an allowable range for controlling error Xc.

A total guidance error X of the unmanned vehicle 10 is defined by the following expression.

$$X \text{ (guidance error)} = 2Xp \text{ (position measurement error)} + \Delta X \text{ (positional shift)} \quad (1)$$

On the other hand, the guidable range D in which the position measurement error 2Xp is added to the allowable range for controlling error Xc is defined by the following expression.

$$D \text{ (guidable range)} = 2Xp \text{ (position measurement error)} + Xc \text{ (allowable range for controlling error)} \quad (2)$$

An area outside the guidable range D is a safety zone, a zone for other vehicles, obstacles or an area where traveling is prohibited such as road shoulders.

For this reason, a condition for safely guiding the unmanned vehicle 10 to travel is:

$$D \text{ (guidable range)} > X \text{ (guidance error)} \quad (3).$$

On the other hand, if the guidance error X exceeds the guidable range D, in other words, if the positional shift ΔX of the unmanned vehicle 10 exceeds the allowable range for control accuracy Xc, the unmanned vehicle 10 is controlled to reduce the speed or be stopped for safety reasons because there is a possibility that the unmanned vehicle 10 goes into the safety zone, or goes beyond the safety zone and enters into the area where traveling is prohibited.

Next, details of the position measurement accuracy information S1 will be described.

The position measurement accuracy information S1 comprises status information indicating a status of the positional measurement with the GPS satellite 20, and error information indicating an error of the positional measurement with the GPS satellites 20.

The status information is information on each status of a GPS quality indicator contained in GGA (Global Positioning System Fix Data), including "not available" status M1, "point positioning" status M2, "FLOAT" status M3 and "FIX" status M4. The accuracy of the positional measurement with the GPS becomes better and the position measurement error becomes smaller in the order of "not available" status M1/"point positioning" status M2, "FLOAT" status M3 and "FIX" status M4. A basic value of error F at the time of "not available" status M1 or "point positioning" status M2 is represented by a fixed value F1; a basic value of error F at the time of "FLOAT" status M3 is represented by a fixed value F2; and a basic value of error F at the time of "FIX" status M4 is represented by a fixed value F3 (F1>F2>F3).

The error information is information on an accuracy decreasing rate for implementing a 3-dimensional positioning, comprising "RMS latitude error", "RMS longitude error" and "RMS altitude error" included in a GST (GNSS Pseudo range Error Statistics). An error G is calculated based on the accuracy decreasing rate in latitude and longitude, namely, horizontal direction, and the accuracy decreasing rate in altitude, namely, vertical direction.

The position measurement error 2Xp can be obtained using the following expression.

$$2Xp \text{ (position measurement error)} = F \text{ (basic value of error based on status information)} + K \text{ (constant)} \times G \text{ (error based on error information)} \quad (4),$$

where K is constant

FIG. 5 is a flow chart showing a process procedure of the first example, explaining a process implemented by the controller in the unmanned vehicle 10.

In other word, the status information and the error information contained in the position measurement accuracy information S1 are obtained from the position measurement device 11 (step 101); it is determined whether or not the status information is "FIX" status M4 (step 102); and it is determined whether or not the status information is "FLOAT" status M3 (step 103).

As a result, if the status information is "FIX" status M4 (YES in step 102), the basic value of error F is set to the minimum value of F3 in correspondence with the status M4, and the current error G is obtained based on the error information. By substituting them in the expression (4) above, the position measurement error 2Xp is obtained (step 104). Additionally, by substituting the obtained position measurement error 2Xp in the expression (2) above, the allowable range for control error Xc (=D (guidable range; constant)−2Xp (position measurement error)) is obtained. Furthermore, the steering and traveling is control such that the positional shift ΔX between the measured vehicle position Xi and the target point Xid, which is a passing point sequentially set on the target traveling course L, falls into the obtained allowable range for controlling error Xc (step 105).

Additionally, if the status information is "FLOAT" status M3 (Yes in step 103), the basic value of error F is set to the medium value F2 (<F1, >F3) in correspondence with the status M3, and the current error G is obtained based on the error information. By substituting them in the expression (4) above, the position measurement error 2Xp is obtained (step 106). Additionally, by substituting the position measurement error 2Xp in the expression (2) above, the allowable range for controlling error Xc (=D (guidable range; constant)−2Xp (position measurement error)) is obtained. Furthermore, control is performed such that the positional shift ΔX between the measured vehicle position Xi and the target point Xid, which is a passing point sequentially set on the target traveling course L, falls into the obtained allowable range for controlling error Xc (step 105).

Additionally, if the status information is "not available" status M1 or "point positioning" status M2 (No in step 103), the basic value of error F is set to the maximum value F1 (>F2>F3) in correspondence with the status M1 or M2, and the current error G is obtained based on the error information. By substituting them in the expression (4) above, the position measurement error 2Xp is obtained (step 107). Additionally, by substituting the position measurement error 2Xp in the expression (2) above, the allowable range for controlling error Xc (=D (guidable range; constant)−2Xp (position measurement error)) is obtained. Then, control is performed such that the positional shift ΔX between the measured vehicle position Xi and the target point Xid, which is a passing point sequentially set on the target traveling course L, falls into the obtained allowable range for controlling error Xc (step 105).

Control in step 105 will be further described in detail with reference to FIG. 8.

Figure 8:
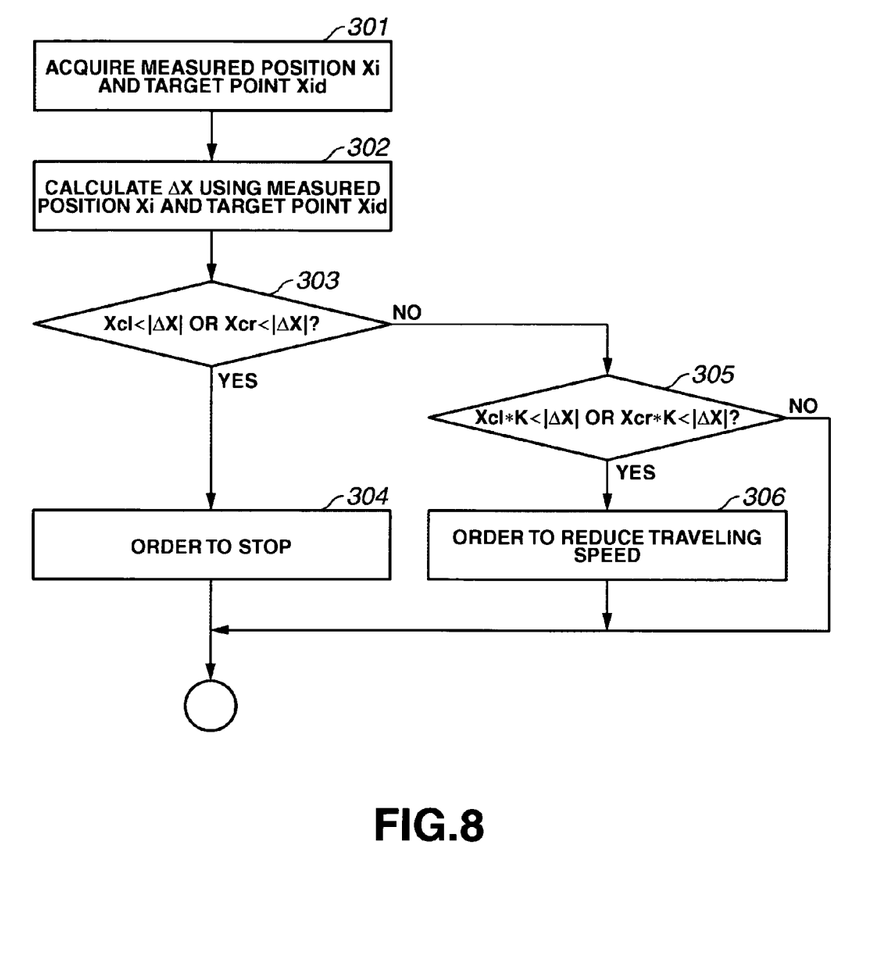
FIG. 8 is a flow chart showing details of control for stopping the unmanned vehicle or reducing speed of the unmanned vehicle.

As shown in FIG. 8, the measured vehicle position Xi and the target point Xid, which is a passing point sequentially set on the target traveling course L, are acquired (step 301).

Next, the positional shift ΔX is calculated based on the measured vehicle position Xi and the target point Xid, which is a passing point sequentially set on the target traveling course L (step 302).

Then, the allowable range for controlling error Xc is divided into a right and a left controlling error allowable ranges XCR, XCL (Xc=XCR+XCL) with the target traveling course L at the center. It is determined whether or not the absolute value |ΔX| of the positional shift ΔX exceeds the right controlling error allowable range XCR or the left controlling error allowable range XCL, in other words, whether or not the following expression (6) or (7) is true (step 303).

$$XCL < |\Delta X| \quad (6)$$

$$XCR < |\Delta X| \quad (7)$$

If the absolute value |ΔX| of the positional shift ΔX exceeds the right controlling error allowable range XCR or the left controlling error allowable range XCL, in other words, if the expression (6) or (7) is true (Yes in step 303), a stopping order for stopping the unmanned vehicle 10 is outputted, and the unmanned vehicle 10 is stopped 8 (step 304).

If the absolute value |ΔX| of the positional shift ΔX does not exceed the right controlling error allowable range XCR and the left controlling error allowable range XCL, in other words, if any of the expression (6) and (7) is not true (No in step 303), it is determined whether or not the following expression (8) or (9) is true to determine whether or not the speed of the unmanned vehicle 10 should be reduced.

$$XCL \times k < |\Delta X| \quad (8)$$

$$XCR \times k < |\Delta X| \quad (9),$$

where k is a coefficient defining a threshold value for determining whether or not the speed of the unmanned vehicle 10 should be reduced, and k is smaller than 1 (step 305).

If the expression (8) or (9) is true (Yes in step 305), a speed reduced traveling order for traveling the unmanned vehicle 10 in a reduced speed is outputted, and the unmanned vehicle 10 is traveled in the reduced speed. For example, if the absolute value |ΔX| of the positional shift ΔX does not exceed any of the right controlling error allowable range XCR and the left controlling error allowable range XCL but becomes larger because of poor road condition or disturbance, the speed of the unmanned vehicle 10 is made reduced. Accordingly, trackability for traveling course L to be targeted is improved (step 306). On the other hand, if any of the expression (8) and (9) is not true (No in step 305), the stopping order and the speed reduced traveling order is not outputted, and the process is ended.

With the control as described above, as shown in FIG. 2A, in a situation where the accuracy of the positional measurement with the GPS is good, the position measurement error 2Xp becomes small, and the allowable range for controlling error Xc can be large correspondingly. Thus, the positional shift ΔX of the unmanned vehicle 10 is less likely to go beyond the allowable range for controlling error Xc, resulting in lowering the frequency at which the speed of the unmanned vehicle 10 is reduced and the unmanned vehicle 10 is stopped. Accordingly, the productivity is increased.

Additionally, unlike the conventional technique, as shown in FIG. 2B, there is no need to stop each of the unmanned vehicles 10 even if the information (the status information or the error information) on the accuracy of the positional measurement included in the positional measurement accuracy information S1 sent from GPS satellites 20 indicates that "accuracy of the positional measurement is poor." In a situation where the accuracy of the positional measurement with the GPS is poor, the position measurement error 2Xp becomes large, the allowable range for controlling error Xc becomes small correspondingly. Although this causes the positional shift ΔX of the unmanned vehicle 10 to be likely to go beyond the allowable range Xc for controlling error Xc, the unmanned vehicle 10 can be traveled without stopping. Accordingly, the productivity is increased.

SECOND EXAMPLE

In the second example, it is assumed that the unmanned vehicle 10 travels in a place where there is relatively sufficient margin for a width of a guidable range D.

FIG. 6 is a configuration diagram for explaining a flow of data between the unmanned vehicle 10, the GPS satellite 20 and the control station 30.

As shown in FIG. 6, the unmanned vehicle 10 comprises a GPS (Global Positioning System) position measurement device 11, a controller 12, and a wireless device 13. Additionally, in a given location in the working site, the control station 30 for controlling the unmanned vehicle 10 is provided. Furthermore, the GPS satellite 20 flies in the sky. It should be noted that the differential GPS position measurement system is assumed in the second example. It should be noted that a figure of a GPS base station that receives a signal sent from the GPS satellite 20, generates a position error correction signal and sends the generated signal to the unmanned vehicle 10 is omitted.

The GPS position measurement device 11 is a device that receives a signal S sent from the GPS satellite 20, measures a current position Xi of the unmanned vehicle 10, extracts from the signal S a position measurement accuracy information S1 necessary for guided travel control of the unmanned vehicle 10, sends a measured position Xi to the controller 12 and sends the position measurement accuracy information S1 to the wireless device 13. The wireless device 13 is a device that acquires the position measurement accuracy information S1, sends the information S1 to the control station 30 through wireless transmission, and receives data on a target traveling course L and data on a guidable range D, which will be described later, sent from the control station 30 through wireless transmission. The controller 12 is a device that acquires via the wireless device 13 the data on the target travel course L and the data on the guidable range D, which will be described later, sent from the control station 30 through wireless transmission; receives data on the measured position Xi sent from the GPS position measurement device 11; and controls traveling and steering such that the unmanned vehicle 10 is guided to travel along the target traveling course L based on those data.

The control station 30 is provided with a control system 31. The control system 31 is a device for sending the data on the target traveling course L and the data on the guidable range D to the wireless vehicle 10 through wireless communication. In the second example, the guidable range D is changed in accordance with the position measurement accuracy information S1. The guidable range D is obtained for each point on the target traveling course L.

As shown in FIGS. 3A and 3B, traveling and steering of the unmanned vehicle 10 is controlled such that the positional shift ΔX between the measured vehicle position Xi and the target point Xid, which is a passing point sequentially set on the target traveling course L, falls into an allowable range for controlling error Xc.

A total guidance error X of the unmanned vehicle 10 is defined by the expression (1) (X (guidance error)=2Xp (position measurement error)+ΔX (positional shift)), which has been described earlier.

On the other hand, a guidable range D in which the position measurement error 2Xp is added to the allowable range for control accuracy Xc is defined by the expression (2) (D (guidable range)=2Xp (position measurement error)+Xc (allowable range for control accuracy)), which has been described earlier.

A condition for safely guiding the unmanned vehicle 10 to travel is represented by the expression (3) (D (guidable range)> X (guidance error)), which has been described earlier. On the other hand, if the guidance error X exceeds the guidable range D, in other words, if the positional shift ΔX of the unmanned vehicle 10 exceeds the allowable range for control accuracy Xc, the unmanned vehicle 10 is controlled to reduce the speed or be stopped for safety reasons because there is a possibility that the unmanned vehicle 10 goes into the safety zone, or goes beyond the safety zone and enters into the area where traveling is prohibited.

Details of the position measurement accuracy information S1 are similar to the first example. The position measurement error 2Xp can be obtained using the expression (4) (2Xp (position measurement error)=F (basic value of error based on status information)+K (constant)×G (error based on error information)).

In the second example, the allowable range for controlling error Xc is set for each point on the target traveling course L to a constant value, and the size of the guidable range D is changed in accordance with the position measurement error 2Xp as shown in the expression (5) below.

$$D \text{ (guidable range)}=2Xp \text{ (position measurement error)}+Xc \text{ (allowable range for controlling error; constant)} \quad (5),$$

where, by taking the topographical feature of the working site into consideration, the guidable range D is set not to go into a safety zone, or go beyond the safety zone and enter into an area where traveling is prohibited. When the maximum value of the guidable range in which the topographical feature of the working site is taken into consideration is represented by Dmax, the guidable range D is set to the smaller of the guidable range D obtained from the expression (5) above or the maximum value Dmax. By substituting the guidable range D set as described above in the expression (2) above, the allowable range for controlling error Xc (=D (guidable range)−2Xp (position measurement error)) can be obtained.

Figure 7:
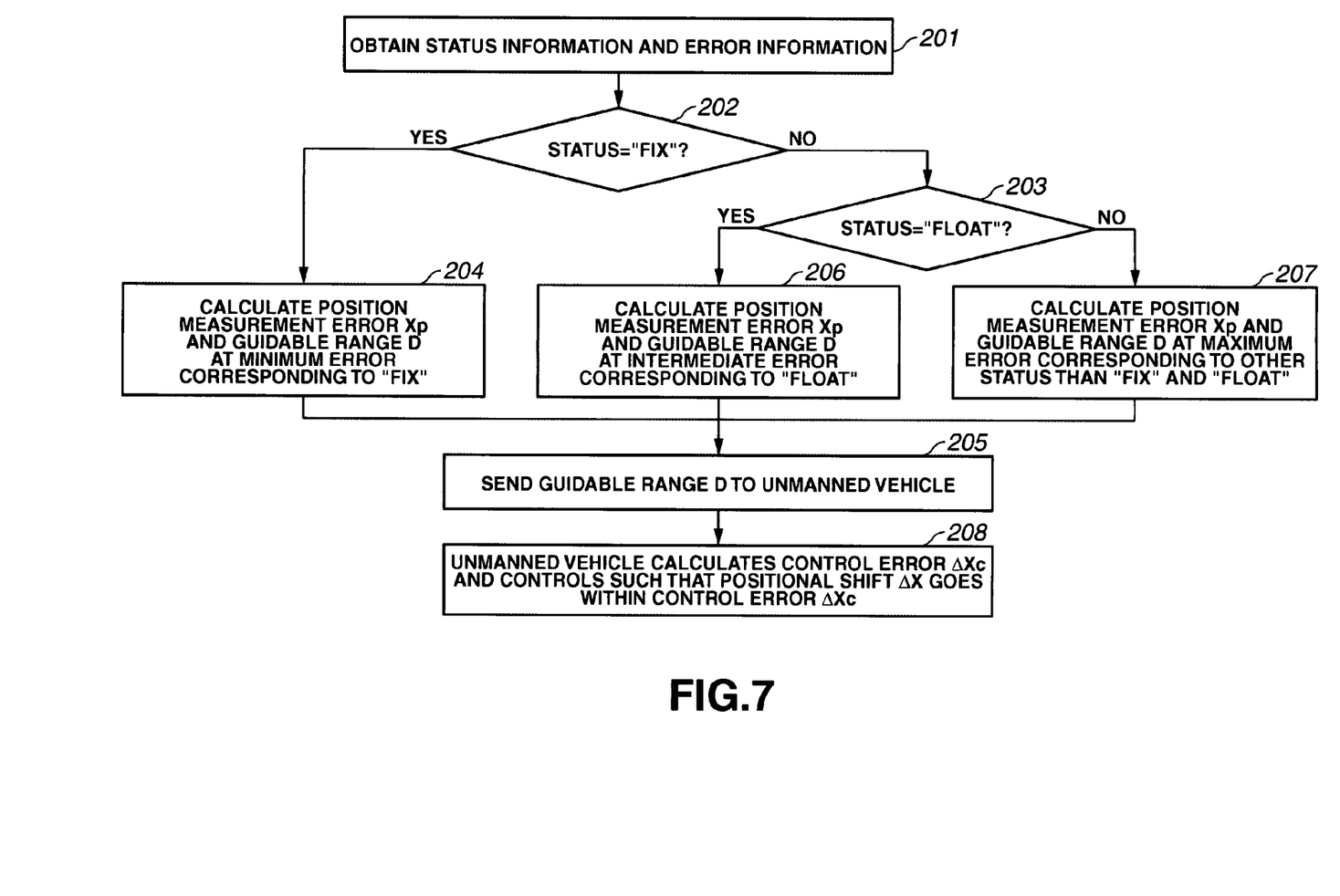
FIG. 7 is a flow chart showing a process procedure of the second example, explaining a process implemented by a control system in the control station and a controller in the unmanned vehicle.

FIG. 7 is a flow chart showing a process procedure of the second example, and illustrates a process implemented by the control system 31 in the control station 30 and the unmanned vehicle 10.

The control station 30 receives the position measurement accuracy information S1 sent from the unmanned vehicle 10, and obtains the status information and the error information contained in the position measurement accuracy information S1 (step 201). Then, whether or not the status information is "FIX" status M4 is determined (step 202), and whether or not the status information is "FLOAT" status M3 is determined (step 203).

As a result, if the status information is "FIX" status M4 (Yes in step 203), the basic value of error F is set to the minimum value F3 in correspondence with the status M4, and the current error G is obtained based on the error information. By substituting those data into the expression (4) above, the position measurement error 2Xp can be obtained. Additionally, by substituting the position measurement error 2Xp into the expression (5), the guidable range D (=2Xp (position measurement error)+Xc (allowable range for controlling error; constant)). Then, the guidable range D is set to the smaller of the guidable range D obtained by the expression (5) or the maximum value Dmax (step 204). The guidable range D obtained as described above is sent to the unmanned vehicle 10 (step 205). The unmanned vehicle 10 receives the data on the guidable range D. By substituting the data in the expression (2) above, the allowable range for controlling error Xc (=D (guidable range)−2Xp (position measurement error)) can be obtained. Then, the steering and traveling is control such that the positional shift ΔX between the measured vehicle position Xi and the target point Xid, which is a passing point sequentially set on the target traveling course L, falls into the obtained allowable range for controlling error Xc (step 208).

Additionally, if the status information is "FLOAT" status M3 (Yes in step 203), the basic value of error F is set to the medium value F2 (>F3, <F1) in correspondence with the status M3, and the current error G is obtained based on the error information. By substituting those data in the expression (4) above, the position measurement error 2Xp can be obtained. Additionally, by substituting the position measurement error 2Xp in the expression (5) above, the guidable range D (=2Xp (position measurement error)+Xc (allowable range for controlling error; constant)) can be obtained. Then, the guidable range D is set to the smaller of the guidable range D obtained from the expression (5) or the maximum value Dmax (step 206). The guidable range D obtained as described above is sent to the unmanned vehicle 10 (step 205). The unmanned vehicle 10 receives the data on the guidable range D. By substituting the data in the expression (2) above, the allowable range for controlling error Xc (=D (guidable range)−2Xp (position measurement error)) can be obtained. Then, the steering and traveling is controlled such that the positional shift ΔX between the measured vehicle position Xi and the target point Xid, which is a passing point sequentially set on the target traveling course L, falls into the obtained allowable range for controlling error Xc (step 208).

Additionally, if the status information is "not available" status M1 or "point positioning" status M2 (No in step 203), the basic value of error F is set to the maximum value F1 (>F2>F3) in correspondence with the status M1 or M2, and the current error G is obtained based on the error information. By substituting those data in the expression (4) above, the position measurement error 2Xp can be obtained. Additionally, by substituting the position measurement error 2Xp in the expression (5) above, the guidable range D (=2Xp (position measurement error)+Xc (allowable range for controlling error; constant)) can be obtained. Then, the guidable range D is set to the smaller of the guidable range D obtained from the expression (5) or the maximum value Dmax (step 207). The guidable range D obtained as described above is sent to the unmanned vehicle 10 (step 205). The unmanned vehicle 10 receives the data on the guidable range D. By substituting the data in the expression (2) above, the allowable range for controlling error Xc (=D (guidable range)−2Xp (position measurement error)) can be obtained. Then, the steering and traveling is controlled such that the positional shift ΔX between the measured vehicle position Xi and the target point Xid, which is a passing point sequentially set on the target traveling course L, falls into the obtained allowable range for controlling error Xc (step 208).

It should be noted that the details of the control in step 208 is similar to the details of the process in FIG. 8 as described above.

With the control as described above, as shown in FIG. 3A, in a situation where the accuracy of the positional measurement with the GPS is good, the position measurement error 2Xp becomes small, and the allowable range for controlling error D becomes small correspondingly. Since the allowable range for controlling error Xc is originally set to a large size, the positional shift ΔX of the unmanned vehicle 10 is less likely to go beyond the allowable range for controlling error Xc, resulting in lowering the frequency at which the speed of the unmanned vehicle 10 is reduced and the unmanned vehicle 10 is stopped. Accordingly, the productivity is increased.

Additionally, unlike the conventional technique, as shown in FIG. 3B, there is no need to stop each of the unmanned vehicles 10 even if the information (the status information or the error information) on the accuracy of the positional measurement included in the positional measurement accuracy information S1 sent from GPS satellites 20 indicates that "accuracy of the positional measurement is poor." The guidable range D is set to a large size in accordance with the large position measurement error 2Xp in a situation where the accuracy of the positional measurement with the GPS is poor, and control for guided travel of the unmanned vehicle 10 is performed as normal, whereby the unmanned vehicle 10 can be traveled without stopping. Accordingly, the productivity is increased. Since there is a sufficient margin for the traveling course of the unmanned vehicle 10, even if the position measurement error 2Xp becomes large, the guidable range D can be changed to a large size. Thus, even in a situation where the accuracy of the positional measurement is poor, the guided travel of the unmanned vehicle 10 can be performed with the large allowable range for controlling error Xc, as in a situation where the accuracy of the positional measurement is good. Since the allowable range for controlling error Xc is set to the large size, the positional shift ΔX of the unmanned vehicle 10 is less likely to go beyond the allowable range for controlling error Xc, resulting in lowering the frequency at which the speed of the unmanned vehicle 10 is reduced and the unmanned vehicle 10 is stopped. Accordingly, the productivity is increased.

It should be noted that, in each of the examples, the position measurement error 2Xp is calculated based on both the status information and the error information contained in the position measurement accuracy information S1. However, it may be possible to calculate the position measurement error 2Xp based only on the status information, or to calculate the position measurement error 2Xp based only on the error information.

What is claimed is:

1. A control device for guided travel of an unmanned vehicle, in which the unmanned vehicle is guided to travel with a signal sent from a GPS satellite, measuring its own vehicle position based on the received signal, and controlling such that a positional shift (ΔX) between the measured vehicle position and a target point that is a passing point sequentially set on a target traveling course falls into an allowable range for controlling error, the control device comprising,
   a control system that sets a guidable range to a constant value in advance such that a position measurement error (2Xp) is added to the allowable range for controlling error;
   a GPS position control measurement device that extracts and outputs position measurement accuracy information acquired from the signal sent from the GPS satellite; and
   a controller that controls the travel of the unmanned vehicle by setting the position measurement error (2Xp) based on the position measurement accuracy information output from the GPS position control measurement device, by setting the allowable range for controlling error based on the position measurement error (2Xp), and by making the positional shift (ΔX) between the measured vehicle position and the target point that is the passing point sequentially set on the target traveling course fall into the allowable range for controlling error set based on the position measurement error (2Xp).

2. A control device for guided travel of an unmanned vehicle, in which the unmanned vehicle is guided to travel with a signal sent from a GPS satellite measuring its own vehicle position based on the received signal, and controlling such that a positional shift (ΔX) between the measured vehicle position and a target point that is a passing point sequentially set on a target traveling course falls into an allowable range for controlling error, the controlling device comprising,
   a GPS position measurement device that extracts and outputs position measurement accuracy information acquired from the signal sent from the GPS satellite;
   a control system that sets a position measurement error (2Xp) based on the position measurement accuracy information input from the GPS position control measurement device, and
   sets a guidable range based on the allowable range for controlling error fixed in advance to a fixed valve and the position measurement error (2Xp); and
   a controller that controls the travel of the unmanned vehicle by making the positional shift (ΔX) between the measured vehicle position and the target point that is the passing point sequentially set on the target traveling course fall into the allowable range for controlling error set by the control system.

3. The control device for guided travel of the unmanned vehicle according to claim 1, wherein
   the position measurement accuracy information acquired from the signal sent from the GPS satellite is status information indicating a status of positional measurement with a GPS, and
   the position measurement error (2Xp) is changed according to the status information.

4. The control device for guided travel of the unmanned vehicle according to claim 1, wherein
   the position measurement accuracy information acquired from the signal sent from the GPS satellite is error information indicating an error of positional measurement with a GPS, and
   the position measurement error (2Xp) is changed according to the error information.

5. The control device for guided travel of the unmanned vehicle according to claim 2, wherein
   the position measurement accuracy information acquired from the signal sent from the GPS satellite is status information indicating a status of positional measurement with a GPS, and
   the position measurement error (2Xp) is changed according to the status information.

6. The control device for guided travel of the unmanned vehicle according to claim 2, wherein
   the position measurement accuracy information acquired from the signal sent from the GPS satellite is error information indicating an error of positional measurement with a GPS, and
   the position measurement error (2Xp) is changed according to the error information.

7. A control device for guided travel of an unmanned vehicle, in which the unmanned vehicle is guided to travel with a signal sent from a GPS satellite, measuring its own vehicle position based on the received signal, and controlling such that a positional shift (ΔX) between the measured vehicle position and a target point that is a passing point sequentially set on a target traveling course falls into the allowable range for controlling error, the control device comprising, a GPS position control measurement device that extracts and outputs position measurement accuracy information acquired from the signal sent from the GPS satellite;

a control system that sets a guidable range in advance to a fixed value; and a controller that controls the travel of the unmanned vehicle by setting a position measurement error (2Xp) based on the position measurement accuracy information input from the GPS position control measurement device, by setting the allowable range for controlling error by subtracting the set position measurement error (2Xp) from the guidable range set to the fixed value, and by making the positional shift (ΔX) between the measured vehicle position and the target point that is the passing point sequentially set on the target traveling course fall into the set allowable range for controlling error.

8. A control device for guided travel of an unmanned vehicle, in which the unmanned vehicle is guided to travel with a signal sent from a GPS satellite, measuring its own vehicle position based on the received signal, and controlling such that a positional shift (ΔX) between the measured vehicle position and a target point that is a passing point sequentially set on a target traveling course falls into an allowable range for controlling error, the control device comprising, a GPS position control measurement device that extracts and outputs position measurement accuracy information acquired from the signal sent from the GPS satellite;

a control system that sets a position measurement error (2Xp) based on the position measurement accuracy information input from the GPS position control measurement device, and sets a guidable range by adding the allowable range for controlling error fixed in advance to a fixed value to the set position measurement error (2Xp); and a controller that controls the travel of the unmanned vehicle by making the positional shift (ΔX) between the measured vehicle position and the target point that is the passing point sequentially set on the target traveling course fall into the allowable range for controlling error set by the control system.

* * * * *